US012319395B1

(12) United States Patent
Bång et al.

(10) Patent No.: US 12,319,395 B1
(45) Date of Patent: Jun. 3, 2025

(54) PROPULSION DEVICE FOR EXERTING THRUST TO A FLUID

(71) Applicant: SUBMERSED TECHNOLOGIES PP2 AB, Bromma (SE)

(72) Inventors: Emil Bång, Bromma (SE); John Änggård, Skutskär (SE); Mathias Andersson, Obbola (SE); Robert Hillgren, Linköping (SE)

(73) Assignee: SUBMERSED TECHNOLOGIES PP2 AB, Bromma (SE)

( * ) Notice: Subject to any disclaimer, the term of this patent is extended or adjusted under 35 U.S.C. 154(b) by 0 days.

(21) Appl. No.: 18/766,033

(22) Filed: Jul. 8, 2024

Related U.S. Application Data

(63) Continuation of application No. PCT/EP2023/085121, filed on Dec. 11, 2023.

(30) Foreign Application Priority Data

Dec. 19, 2022 (EP) .................................... 22214638

(51) Int. Cl.
*B63H 1/14* (2006.01)
*B64C 11/00* (2006.01)

(52) U.S. Cl.
CPC ................ *B63H 1/14* (2013.01); *B64C 11/00* (2013.01)

(58) Field of Classification Search
CPC ... B63H 1/14; B63H 1/15; B63H 1/20; B63H 1/28; B63H 2001/145; B63H 11/005;

(Continued)

(56) References Cited

U.S. PATENT DOCUMENTS 1,986,151 A * 1/1935 Johnston ............... F04D 29/327
   416/193 R
4,253,799 A * 3/1981 Eichler .................. B64C 11/00
   416/175

(Continued)

FOREIGN PATENT DOCUMENTS

GB          188206 A     11/1922

OTHER PUBLICATIONS

Extended European Search Report for EP Application No. 22214638.3 mailed Jun. 20, 2023, 5 pages.

(Continued)

*Primary Examiner* — Brian P Wolcott
(74) *Attorney, Agent, or Firm* — RMCK Law Group, PLC

(57) ABSTRACT

A propulsion device for exerting thrust to a fluid comprises a central hub and at least two propulsive arrangements which protrude radially from the hub. Each propulsive arrangement comprises front and rear propulsive elements extending from a front inner end to a front outer end and from a rear inner end to a rear outer end, respectively. Inner and outer guide elements extend from the front end to the rear end. An elongate front distance member and an elongate rear distance member extend radially from the hub to the inner guide element. At least one intermediate propulsive element is arranged between the front and rear propulsive elements and extends radially from the inner guide element to the outer guide element. The inner guide element, the front distance member, the rear distance member and the periphery of the hub define an open space allowing free passage of the fluid.

15 Claims, 6 Drawing Sheets

(58) Field of Classification Search
CPC ....... B63H 11/008; B63H 7/02; F04D 29/326; F04D 29/327
See application file for complete search history.

(56) References Cited

U.S. PATENT DOCUMENTS

| | | | | |
|---|---|---|---|---|
| 7,484,925 | B2* | 2/2009 | Carlson | F04D 29/384 |
| | | | | 416/244 R |
| 11,511,837 | B2* | 11/2022 | Jardiniano | B63H 1/24 |
| 11,945,562 | B1* | 4/2024 | Kipnis | B63H 1/20 |
| 2021/0354801 | A1 | 11/2021 | Jardiniano | |

OTHER PUBLICATIONS

International Search Report and Written Opinion for International Application No. PCT/EP2023/085121 mailed Mar. 19, 2024, 12 pages.

* cited by examiner

PROPULSION DEVICE FOR EXERTING THRUST TO A FLUID

CROSS-REFERENCE TO RELATED APPLICATIONS

This application is a bypass continuation of International Application No. PCT/EP2023/085121, filed Dec. 11, 2023, which claims priority to European Patent Application No. 22214638.3, filed Dec. 19, 2022. The disclosures of each of the above applications are incorporated herein by reference in their entirety.

TECHNICAL FIELD

The present disclosure relates generally to the field of propulsion devices for generating thrust to a fluid. The propulsion device disclosed herein may be used at various applications such as for the propulsion of vessels including both marine and airborne vessels including drones and for the generation of a forced fluid flow, such as at fans, blowers and liquid pumps.

BACKGROUND

Traditional screw-propellers typically comprise a rotational hub with two or more blades which are fixed to the hub and protrude radially therefrom. The blades are arranged with a pitch such as to define a helical spiral resembling a helical screw line.

Such traditional screw-propellers typically present a comparatively high rotational resistance which results in high motor load and low energy efficiency. The traditional screw-propellers are also exposed to cavitation which in turn may damage the blades, cause undesirable vibrations, and give rise to noise. Additionally, such traditional screw-propellers typically exhibit a substantial slip which further reduces the energy efficiency.

GB 188,206 discloses a screw-propeller comprising a hub and a plurality of radiating supporting main blades fixed to the hub. Each main blade is connected a first auxiliary blade arranged in front of the main blade and to a second auxiliary blade arranged behind the main blade. The tips of the main blades and the auxiliary blades extend radially beyond the connections between the main and the auxiliary blades.

SUMMARY

An object of the present invention is to provide an enhanced propulsion device for generating thrust to a fluid.

Another object is to provide such a propulsion device which exhibits a high efficiency.

A further object is to provide such a propulsion device which generates an axial flow with a comparatively very small separation.

Yet another object is to provide such a propulsion device which exhibits comparatively low resistance to the fluid.

Still another objective is to provide such a propulsion device which prevents cavitation.

A further object is to provide such a propulsion device which provides a comparatively low slip.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

According to a first aspect, the present disclosure provides a propulsion device as set out in the appended claim 1. The propulsion device is arranged for exerting thrust to a fluid. The propulsion device comprises a central hub having a front end and a rear end and is rotational about a rotational axis extending longitudinally between the front and rear ends, and at least two propulsive arrangements which protrude radially from the hub and which are evenly distributed about the circumference of the hub. Each propulsive arrangement comprises a front propulsive element which extends radially from a front inner end to a front outer end, a rear propulsive element which extends radially from a rear inner end to a rear outer end. An outer guide element extends from the front outer end to the rear outer end at a radial outer guide element distance from the rotational axis and an inner guide element extends from the front inner end to the rear inner end at a radial inner guide element distance from the rotational axis. An elongate front distance member and an elongate rear distance member extend radially from the hub to the inner guide element. At least one intermediate propulsive element is arranged between the front and rear propulsive elements and extends radially from the inner guide element to the outer guide element. The longitudinal projections of the front propulsive element, the intermediate propulsive element and the rear propulsive element overlap at least partially. The inner guide element, the front distance member, the rear distance member and the periphery of the hub define an open space allowing free passage of the fluid.

By providing the propulsion device with an intermediate propulsive element which extends from an inner guide element arranged radially at a distance from the hub, the propulsion device provides additional thrust generating surface at a peripheral portion of the propulsion device. Thrust generating area arranged at the peripheral portion of the propulsion device provides higher trust and lower resistance in the axial and tangential direction than blade area at the central portion of traditional screw-propellers. The intermediate propulsive element thus increases the efficiency of the propulsion device by increasing the thrust while maintaining the resistance low. The inner guide element and outer guide element which extend longitudinally between all propulsive elements in one propulsive arrangement reduce radial flow and promote the generation of flows in the axial direction. Hereby, the axial component of the flow generated by the propulsion device is increased while keeping the lateral separation of the flow low. This also contributes to increase the efficiency of the propulsion device. The outer guide element and inner guide element also increase the rigidity of the propulsion device, thus allowing the propulsive elements to be comparatively thin and reducing vibrations. The outer guide element further reduces cavitation at the peripheral portion of the propulsive elements, which in turn reduces wear of the propulsive elements as well as noise and other vibrations.

The propulsion device has proven to exhibit high efficiency, low resistance, both in the axial and circumferential directions, a highly concentrated axial flow with small lateral separation, low degree of cavitation and low levels of noise and other vibrations.

At an embodiment of the propulsion device, the longitudinal projections of the front propulsive element, the intermediate propulsive element and the rear propulsive element fully overlaps. This results in a further reduction of axial resistance.

The lengths of the axial projection of the chord lines of the front, rear and intermediate propulsive element may be essentially constant. The axial projection of the propulsive elements thus exhibits a rectangular or rhomboid shape. By this means the active propulsive element area may be large while maintaining the chord lines short. This in turn increases the thrust while minimizing cavitation.

The maximal chord line of each of the front, rear and intermediate propulsive elements, may be a short chord line. Such a short chord line is defined by NACA standard nomenclature. Thus, the propulsive elements exhibit, in the active region radially outside the inner guide element, a comparatively short extension in the circumferential direction, which reduces cavitation.

The inner guide element distance (IG) may be at least 40% of the outer guide distance (OG). This means that the intermediate propulsive element is positioned at a sufficient distance from the rotational axis for providing great thrust in relation to the resistance.

The outer guide element may protrude rearwardly from the rear outer end. The protruding portion of the outer guide element then provides a so-called winglet which efficiently reduces cavitation.

The outer guide element and the inner guide element may exhibit an essentially constant longitudinal cross section which is outwardly convex. This reduces the resistance in the circumferential direction.

The outer guide element and the inner guide element may exhibit an essentially constant longitudinal cross section which is inwardly concave. This further reduces the resistance in the circumferential direction.

The radius of the convex or concave curvature may be essentially equal to the radial distance from the rotational axis to the respective outer guide element and inner guide element. This also reduces the resistance in the circumferential direction.

The distance between a leading edge and a trailing edge of each front, rear and intermediate propulsive element may be essentially constant. This also allows a large active propulsive elements area while keeping the chord line comparatively short.

The front distance member and the rear distance member may be longitudinally aligned.

The front distance member and the rear distance member may be arranged as radial extensions from the front inner end and the rear inner end respectively to the hub.

Each propulsive arrangement may comprise a plurality, preferably two or three intermediate propulsive elements. Hereby the advantages of arranging active propulsive elements area at the periphery of the propulsion device is further enhanced.

The propulsion device may comprise two propulsive arrangements mutually separated in the circumferential direction by 180° or three propulsive arrangements mutually separated in the circumferential direction by 120° or four propulsive arrangements mutually separated in the circumferential direction by 90° or five propulsive arrangements mutually separated in the circumferential direction by 72° or six propulsive arrangements mutually separated in the circumferential direction by 60°.

Further objects and advantages of the propulsion device according to the first, second and third aspects will be apparent from the following description of exemplifying embodiments and from the appended claims.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

The propulsion device shown in all FIGS. 1-4 are intended for the propulsion of marine vessels. Other not shown embodiments within the scope of the present disclosure may be used at other applications such as for the propulsion of air crafts including drones or for generating forced fluid flows e.g. at fans, blowers and pumps.

Figure 1:
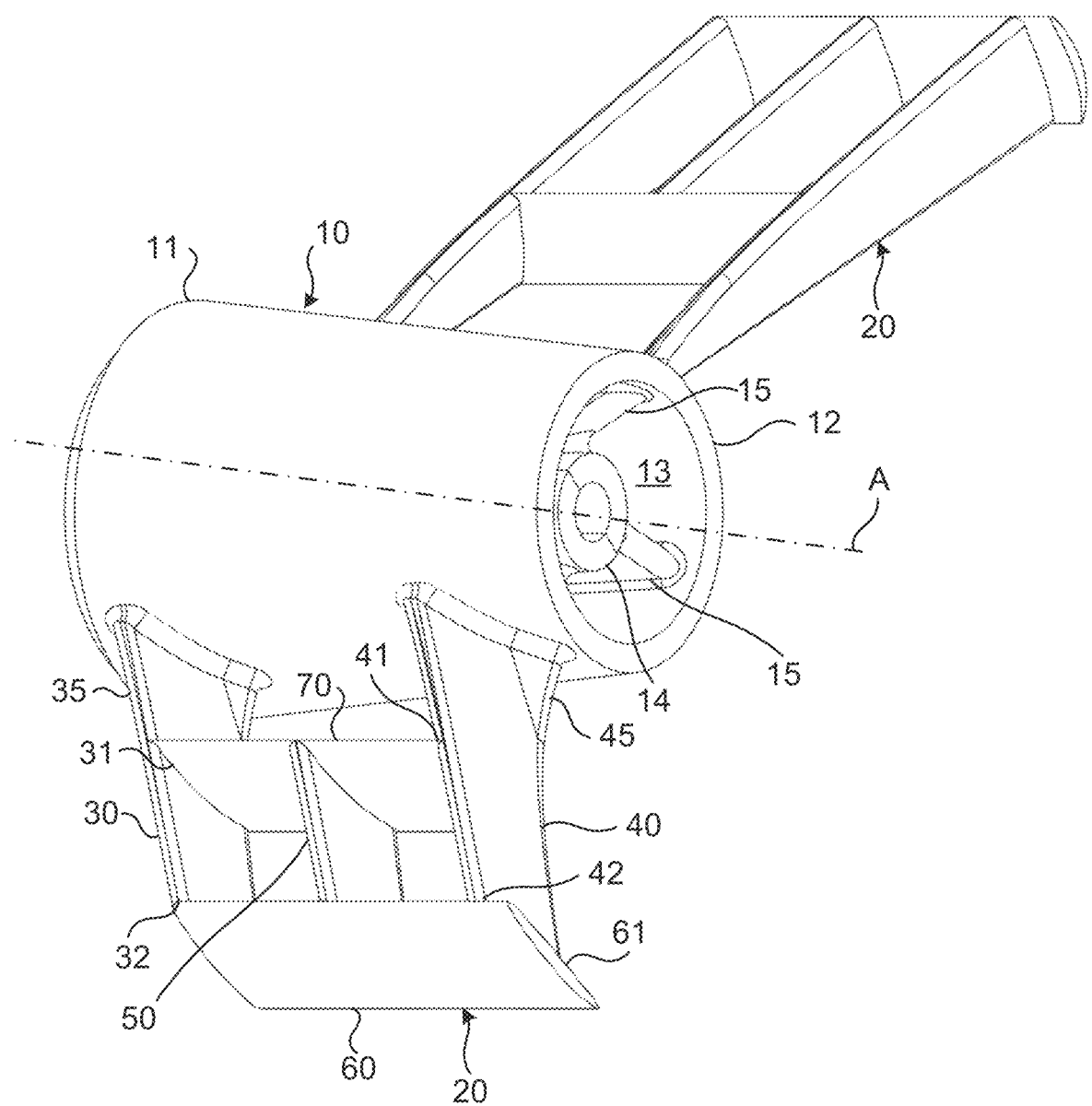
FIG. 1 is a perspective view of the propulsion device according to a first embodiment.
Figure 2A:
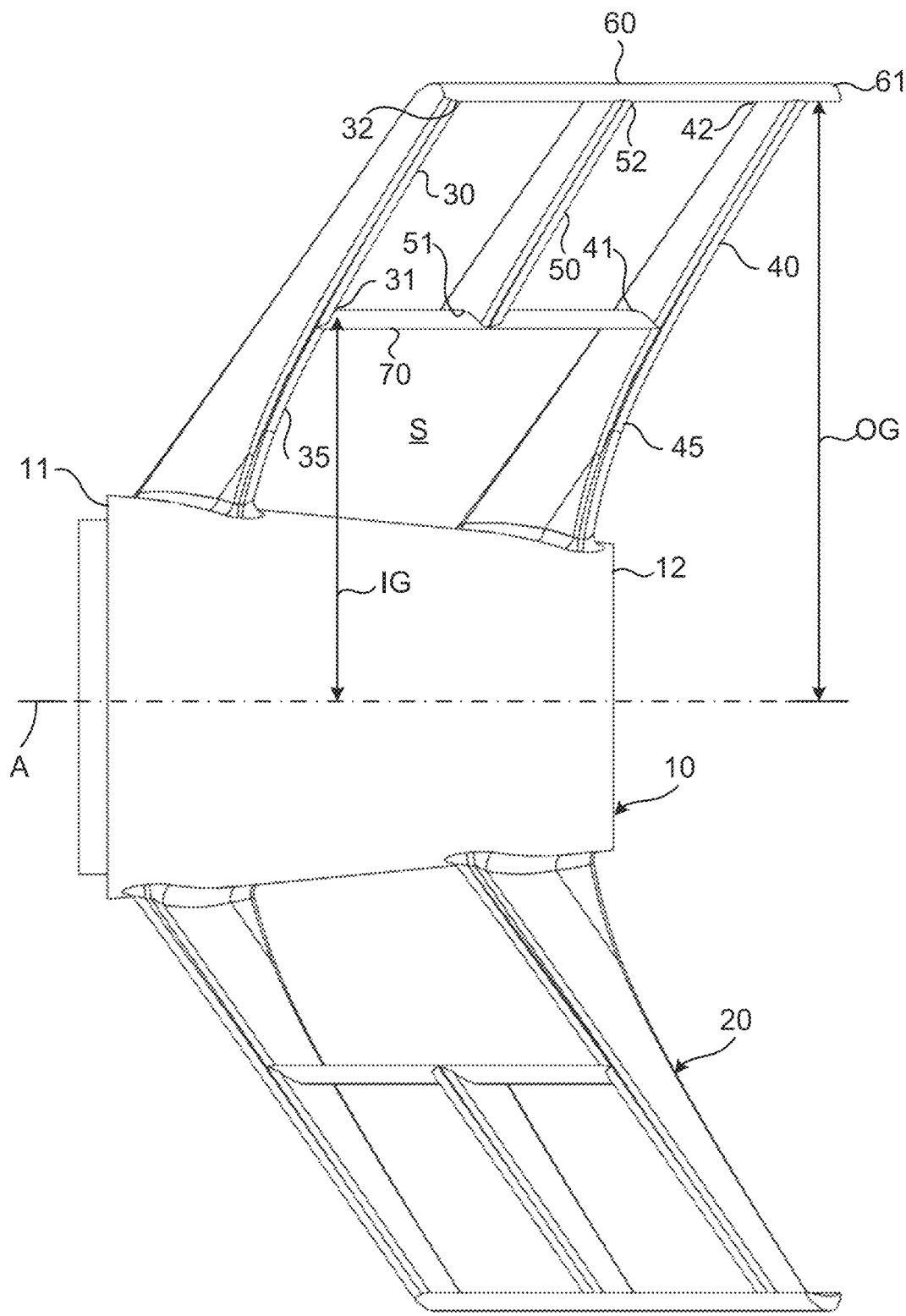
FIGS. 2a-c are plan views from a side, the front and the rear of the propulsion device shown in FIG. 1.
Figure 2B:
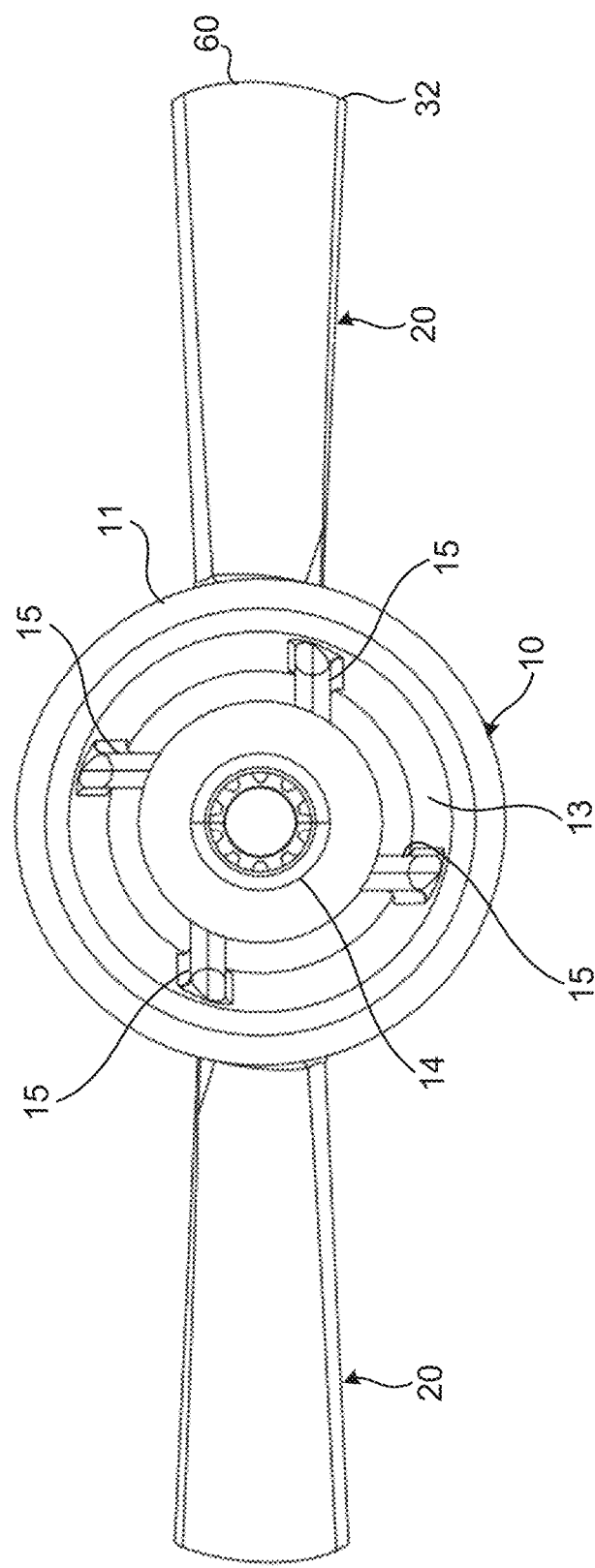
Figure 2C:
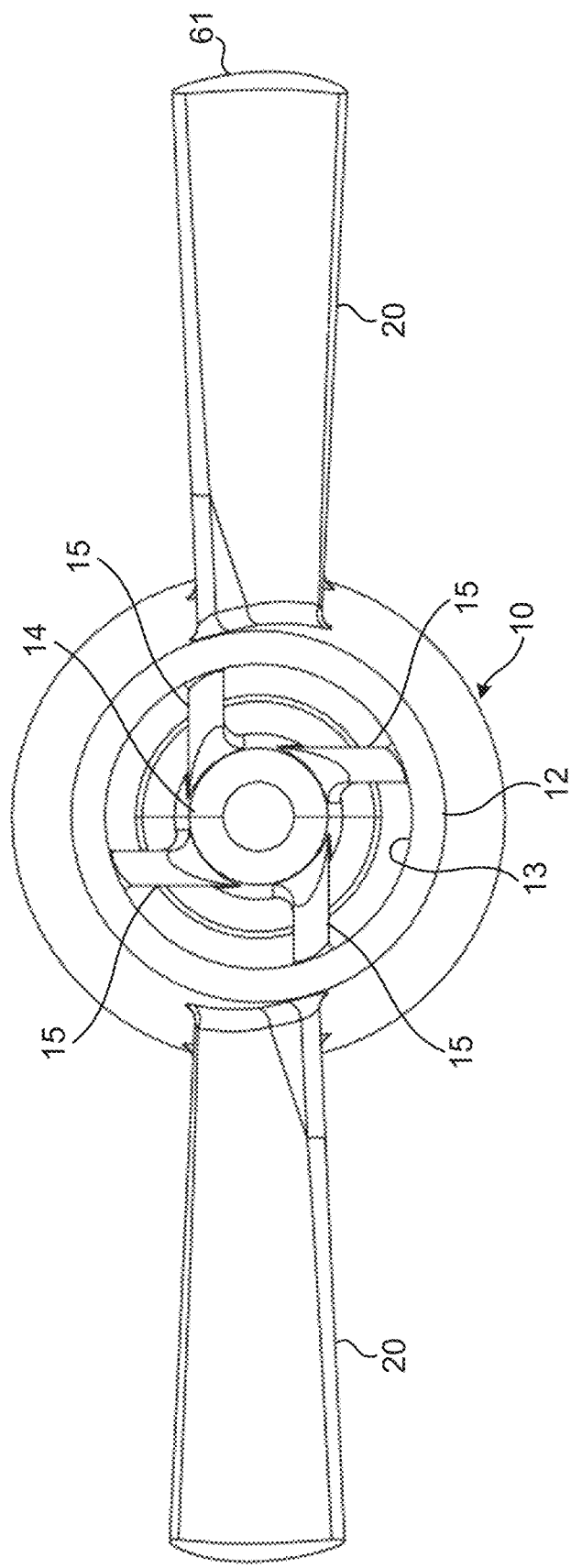

The marine propulsion device according to the embodiment shown in FIGS. 1-2c comprises a central hub 10 which is rotational about a central rotational axis A. In the shown example the hub 10 is arranged for passing exhaust gases from an outboard or inboard engine (not shown) through the interior of the hub. The hub is conical end tappers from a front end 11 to a rear end 12. The hub 10 exhibits a central bore 13 extending longitudinally from the front end 11 to the rear end 12. A cylindrical internally splined sleeve member 14 extends centrally through the bore 13. The sleeve member 14 is fixed to the inner wall of the bore 13 by means of four radial struts 15 such that an annular channel for expelling exhaust gases is formed in the bore 13 around the sleeve member 14.

The propulsion device further comprises two propulsive arrangements 20 which are fixed to the peripheral surface of the hub 10 and separated by 180°. Both propulsive arrangements are identical and in the following, only one will be described for reasons of simplicity.

The propulsive arrangements 20 each comprise a front propulsive element 30, a rear propulsive element 40 and an intermediate propulsive element 50. The front propulsive element 30 exhibits a front inner end 31 and a front outer end 32. Correspondingly, the rear propulsive element 40 exhibits a rear inner end 41 and a rear outer end 42.

An outer guide element 60 extends in parallel with the rotational axis A, from the front outer end 32 to the rear outer end 42. The outer guide 60 is arranged at a radial outer guide element distance OG from the rotational axis A. The outer guide element 60 protrudes axially a short distance rearwardly of the rear propulsive element 40, forming a rearwardly protruding winglet 61.

An inner guide element 70 extends in parallel with the rotational axis A from the front inner end 31 to the rear inner end 41. The inner guide element 70 is fixed to the periphery of the hub by means of an elongate front distance member 35 and an elongate rear distance member 45. The distance members 35, 45 each extend radially from the hub to the inner guide element 70. In the shown example, the front distance member 35 forms a radially inwardly directed extension of the front propulsive element 30 and the rear distance member forms a radially inwardly directed extension of the rear propulsive element 40. However, at other not shown embodiments, the distance members may be arranged at other longitudinal positions of the inner guide element, as long as they hold the inner guide element 70 at a radial distance from the hub 10.

The inner guide element 70 is arranged at a radial inner guide element distance IG from the rotational axis A. The inner guide element distance IG is shorter than the outer guide distance OG but larger than the maximum outer diameter of the hub 10. I.e. the inner guide element 70 is arranged radially between the outer periphery of the hub and the outer guide element 60. In the shown example the inner guide element distance IG is approx. 60% of the outer guide element distance OG. It is preferred that the inner guide element distance IG is between 40% and 75% of the outer guide element distance OG.

The radially outer surface of the outer guide element 60 is convex with a radius of curvature which is essentially equal to the outer guide element distance OG. The radially inner surface of the outer guide element 60 is concave also with a radius of curvature which is essentially equal to the outer guide element distance OG.

Correspondingly, the inner guide element 70 has an outer convex surface and an inner concave surface, both of which exhibit a radius of curvature which is essentially equal to the inner guide element distance IG. By this means the circumferential resistance of the propulsion device is reduced.

The intermediate propulsive element 50 is arranged longitudinally at the centre between the front propulsive element 30 and the rear propulsive element 40 and extends radially from the inner guide element 70 to the outer guide element 60. The intermediate propulsive element 50 has an intermediate inner end 51 which is fixed to the inner guide 70 and an intermediate outer end 52 which is fixed to the outer guide 60.

From the above description it is understood that the front distance member 35, the rear distance member 45, the periphery of the hub 10 and the inner guide element 70 define an open space through which the fluid, which in this case is water, may flow freely and which does not present any axial or circumferential resistance as the propulsion device rotates.

The front 30, rear 40 and intermediate propulsive elements 50 exhibit essentially identical geometries. At each propulsive element 30, 40, 50 the leading edge is arranged essentially in parallel with the trailing edge. Further, the axial projection of the propulsive elements is essentially rhombic. Additionally, the widths in the circumferential direction of the propulsive elements 30, 40, 50, the inner guide element 70 and the outer guide element 60 are essentially equal.

The width in the circumferential direction of the propulsive elements 30, 40, 50 may also be expressed by the length of the chord line (or chord) extending through the respective propulsive element from the leading edge to the trailing edge and by the axial projection of this chord line. With a propulsion device according to this disclosure it is possible to keep the chord line and its axial projection short in comparison to traditional screw-propellers while still achieving satisfactory thrust. This is of great advantage since short or small chord lines reduces the risk of cavitation. It has shown that the chord line of the propulsive elements 30, 40, 50, preferably is a so called short or small chord line according to NACA standard terminology.

Figure 3:
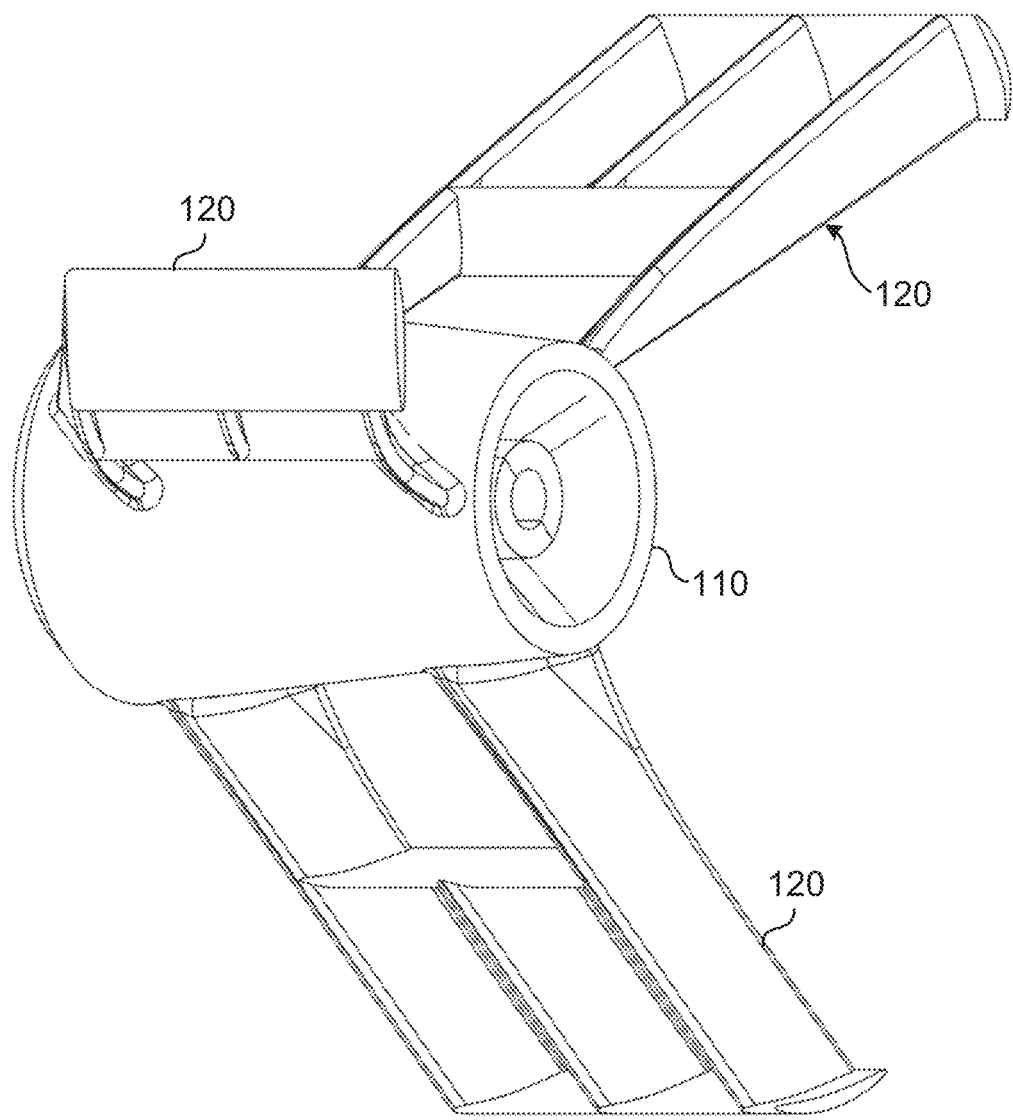
FIG. 3 is a perspective view of the propulsion device according to a second embodiment.

FIG. 3 illustrates a second embodiment of the propulsion device comprising a hub 110 and three propulsive arrangements 120 distributed along the periphery of the hub 110 and separated by 120°.

Figure 4:
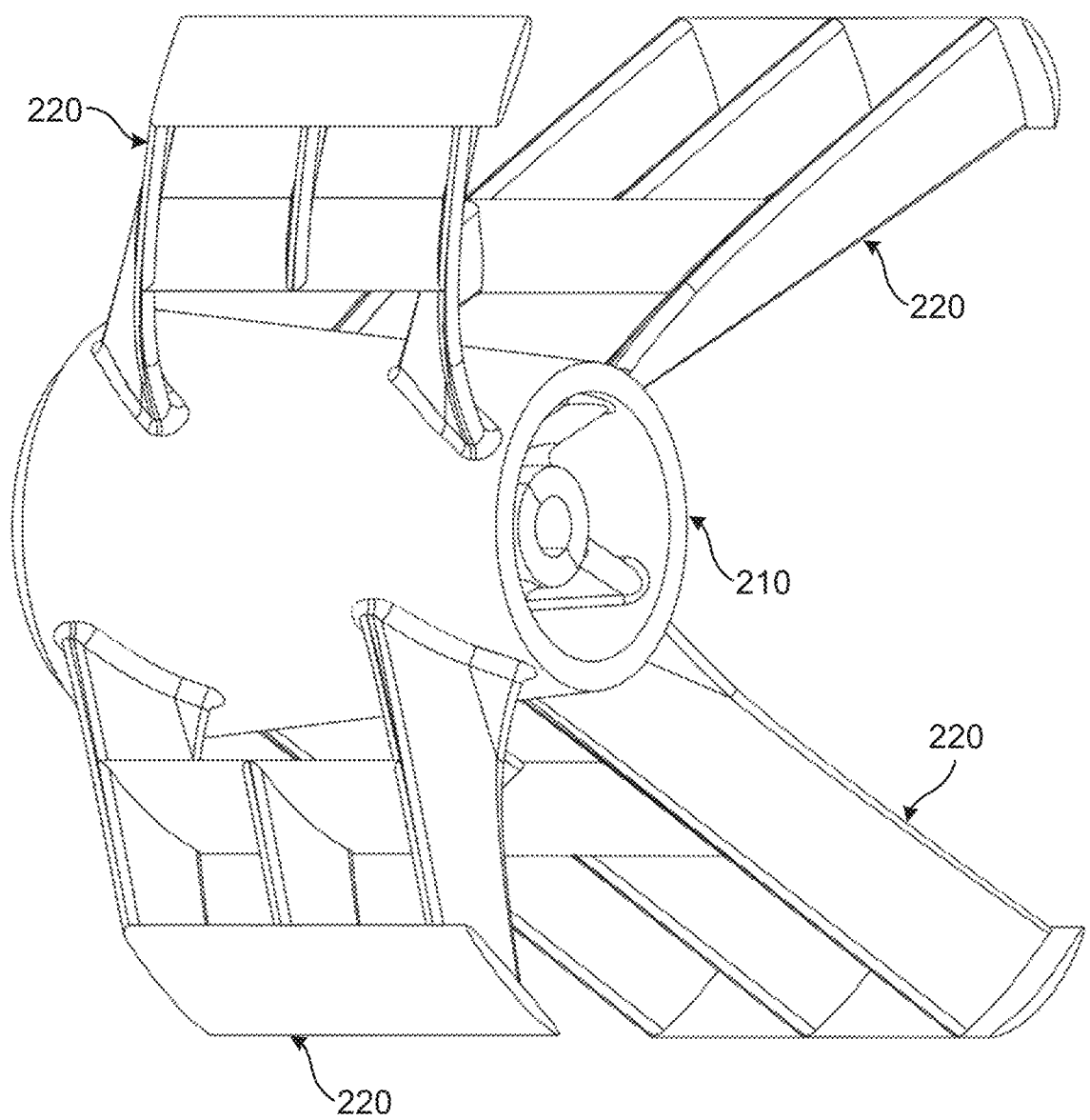
FIG. 4 is a perspective view of the propulsion device according to a third embodiment.

FIG. 4 illustrates a third embodiment of the propulsion device comprising a hub 210 and four propulsive arrangements 220 distributed along the periphery of the hub 210 and separated by 90°.

At the embodiments shown in FIGS. 3 and 4 the hub 110, 210 and each propulsive arrangement 120, 220 are essentially equal to the hub 10 and the propulsive arrangement 20 shown in FIGS. 1-2c and described above and the description is not repeated here.

At a not shown embodiment, each propulsive arrangement may comprise more than one intermediate propulsive element arranged between a front and a rear propulsive element. Also in such cases, the intermediate propulsive elements extend radially between an inner guide element which is arranged at a distance from the hub and an outer guide element, which outer guide element extends between the outer end of the front and rear propulsive elements. At such embodiments each propulsive arrangement comprises a total number of active propulsive elements arranged between the inner guide element and the outer guide element which is equal to the sum of intermediate propulsive element plus two.

At a further not show embodiment each propulsive arrangement may comprise more than two elongate distance members connecting the inner guide element to the hub.

At all propulsive arrangements shown and described above it is preferred that all propulsive elements in a propulsive arrangement, are aligned longitudinally and fully overlap each other in the longitudinal direction.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

The invention claimed is:

1. A propulsion device for exerting thrust to a fluid, which comprises a central hub having a front end and a rear end and being rotational about a rotational axis extending longitudinally between the front and rear ends, and at least two propulsive arrangements which protrude radially from the hub and which are evenly distributed about the circumference of the hub, wherein each propulsive arrangement comprises;

a front propulsive member which: (i) extends radially from the hub, and (ii) defines an elongate front distance member and a front propulsive element, the front propulsive element extending radially from a front inner end to a front outer end, a rear propulsive member which: (i) extends radially from the hub, and (ii) defines an elongate rear distance member and a rear propulsive element, the rear propulsive element extending radially from a rear inner end to a rear outer end, an outer guide element which extends from the front outer end to the rear outer end at a radial outer guide element distance from the rotational axis, an inner guide element which extends from the front inner end to the rear inner end at a radial inner guide element distance from the rotational axis, and at least one intermediate propulsive element arranged between the front and rear propulsive elements and extending radially, from the inner guide element, to the outer guide element, wherein:

the elongate front distance member and the elongate rear distance member each extend radially from the hub to the inner quide element, the longitudinal projections of the front propulsive element, the intermediate propulsive element and the rear propulsive element at least partially overlaps, and the inner guide element, the front distance member, the rear distance member and the periphery of the hub define an open space allowing free passage of the fluid.

2. A propulsion device according to claim 1, wherein the longitudinal projections of the front propulsive element, the intermediate propulsive element and the rear propulsive element fully overlaps.

3. A propulsion device according to claim 1, wherein the lengths of the axial projections of the chord lines of the front, rear and intermediate propulsive elements are essentially constant.

4. A propulsion device according to claim 1, wherein the inner guide distance is at least 40% of the outer guide distance.

5. A propulsion device according to claim 1, wherein the outer guide element protrudes rearwardly from the rear outer end.

6. A propulsion device according to claim 1, wherein the outer guide element and/or the inner guide element has an essentially constant longitudinal cross section which is outwardly convex.

7. A propulsion device according to claim 1, wherein the outer guide element and/or the inner guide element has an essentially constant longitudinal cross section which is inwardly concave.

8. A propulsion device according to claim 6, wherein the radius of the convex or concave curvature is essentially equal to the radial distance from the rotational axis to the respective outer guide element and/or inner guide element.

9. A propulsion device according to claim 1, wherein the distance between a leading edge and a trailing edge of each front, rear and intermediate propulsive element is essentially constant along the radial extension of each propulsive element.

10. A propulsion device according to claim 1, wherein the front distance member and the rear distance member are longitudinally aligned.

11. A propulsion device according to claim 1, wherein the front distance member and the rear distance member are arranged as radial extensions from the front inner end and the rear inner end respectively to the hub.

12. A propulsion device according to claim 1, wherein each propulsive arrangement comprises a plurality of intermediate propulsive elements.

13. A propulsion device according to claim 1, comprising two propulsive arrangements mutually separated in the circumferential direction by 180° or three propulsive arrangements mutually separated in the circumferential direction by 120° or four propulsive arrangements mutually separated in the circumferential direction by 90° or five propulsive arrangements mutually separated in the circumferential direction by 72° or six propulsive arrangements mutually separated in the circumferential direction by 60°.

14. A propulsion device according to claim 1, wherein the inner guide distance is between 40% and 75% of the outer guide distance.

15. A propulsion device according to claim 1, wherein each propulsive arrangement comprises two or three intermediate propulsive elements.

\* \* \* \* \*